United States Patent [19]

Kitahara et al.

[11] Patent Number: 4,743,435
[45] Date of Patent: May 10, 1988

[54] METHOD FOR CLEANING EXHAUST GASES

[75] Inventors: Koichi Kitahara; Takashi Shimada, both of Kanagawa, Japan

[73] Assignee: Japan Pionics., Ltd., Tokyo, Japan

[21] Appl. No.: 711,135

[22] Filed: Mar. 13, 1985

[51] Int. Cl.$^4$ .............................................. B01D 53/34
[52] U.S. Cl. ..................................................... 423/210
[58] Field of Search ........... 423/210 R, 210 M, 210 S, 423/230

[56] References Cited

U.S. PATENT DOCUMENTS

| | | | |
|---|---|---|---|
| 1,519,470 | 12/1924 | Wilson et al. | 423/210 S |
| 2,747,968 | 5/1956 | Pigache | 423/230 |
| 3,812,653 | 5/1974 | Massoth et al. | 55/68 |
| 4,532,115 | 7/1985 | Nishino et al. | 423/210 |

FOREIGN PATENT DOCUMENTS

| | | | |
|---|---|---|---|
| 77627 | 5/1982 | Japan | 423/210 |
| 328592 | 4/1930 | United Kingdom | 423/210 S |

OTHER PUBLICATIONS

*Chemistry*, John C. Bailar, Jr. et al., Academic Press. Inc., 1978, p. 765.
*A Comprehensive Treatise on Inorganic and Theoretical Chemistry*, J. W. Mellor, vol. III, pp. 102, 132, Longmans, Green and Co. 1946.
Chemical Abstract, vol. 95:208,869j (1981).

*Primary Examiner*—John Doll
*Assistant Examiner*—Jeffrey Edwin Russel
*Attorney, Agent, or Firm*—Sughrue, Mion, Zinn, Macpeak & Seas

[57] ABSTRACT

A method for cleaning an exhaust gas containing at least one toxic component selected from the group consisting of arsine, phosphine, diborane and hydrogen selenide is disclosed. The method comprises contacting the toxic component with a molded cleaning agent having a composition consisting essentially of (1) cupric oxide and (2) at least one metal oxide selected from the group consisting of silicon oxide, aluminum oxide and zinc oxide and having a density of from about 1.5 to about 3.5 g/ml, said composition having a metal atomic ratio M/(M+Cu) in the range of from about 0.02 to about 0.7 wherein Cu represents a number of gram atom of copper and M represents a total number of gram atom of silicon, aluminum and/or zinc, to remove the toxic component from the exhaust gas.

6 Claims, No Drawings

METHOD FOR CLEANING EXHAUST GASES

FIELD OF THE INVENTION

This invention relates to a method for cleaning exhaust gases and, more particularly, it relates to a method for cleaning exhaust gases containing toxic components discharged from the production step of semi-conductors, etc.

BACKGROUND OF THE INVENTION

With recent developments of industry in semiconductors and optoelectronics, use of highly toxic hydrides such as arsine, phosphine, diborane and hydrogen selenide has markedly increased. These toxic components are essentially required as raw materials or doping gases in the production of silicon semi-conductors, compound semi-conductors or optical fibers.

Exhaust gases discharged from the process for the production of semi-conductors or optical fibers generally contain unreacted toxic components and, in view of their high toxicity to living organisms, these toxic components must be removed from the exhaust gases before these gases are discharged to open atmosphere in order to prevent environmental pollution.

Known methods for removing such toxic components from the exhaust gas include a wet process which comprises absorbing and decomposing the toxic components in a scrubber, and a dry process which comprises passing the exhaust gas through a column packed with a cleaning agent such as adsorbents or oxidizing agents.

However, the conventional wet process generally has problems such as corrosion of the apparatus due to the use of an absorbing liquid and post-treatment of the absorbing liquid, and thus the wet process is expensive for maintenance of the apparatus.

On the other hand, the conventional process using a cleaning agent comprises oxidative removal of phosphine or arsine using an adsorbing agent, for example, nitrates such as silver nitrate supported on a porous carrier, or a porous carrier impregnated with a metal chloride such as ferric chloride, as disclosed in Japanese patent application (OPI) No. 89837/81 (the term "OPI" as used herein means a published unexamined patent application). Although this conventional process has solved the problems associated with the above-described wet process, it still has problems such that the exhaust gas discharged from the chemical vapor deposition (CVD), ion implantation or doping process must be preliminarily subjected to wet-treatment thereby requiring complicated apparatus.

A further conventional process comprises treating arsine and phosphine using three different absorbents, i.e., inorganic silicates impregnated separately with (1) an aqueous solution of an alkali, (2) an aqueous solution of an oxidizing agent, and (3) an aqueous solution of alkali and an oxidizing agent, as disclosed in Japanese patent publication No. 49822/84. However, this conventional process also includes treatments under wet conditions and, therefore, has disadvantages as described above for the wet process.

A typical dry process for removing arsine used as chemical weapon was to use a gas mask filled with activated carbon. By taking advantage of adsorption ability of activated carbon, various attempts have been made to improve the performace of activated carbon by incorporating and absorbing various materials into activated carbon. For example, Japanese patent application (OPI) No. 160,535/84 discloses arsine-adsorbing agents comprising activated carbon as a carrier having incorporated therein a copper compound, an alkali metal compound, an alkaline earth metal compound, and at least one compound of Al, Ti, V, Cr, Mn, Fe, Co, Ni, Zn, Cd and Pb. Although this adsorbing agent is advantageous in that it can be used in completely dry process, the adsorbing agent of this type is not satisfactory in its relatively weak arsine removal property. Further, since the above adsorbing agent generates heat upon contact with air after adsorption of arsine and has a risk in that the activated carbon may ignite depending upon conditions, its use in industry is severely limited.

As a result of extensive studies for eliminating disadvantages in the conventional process, the present inventors found that the above-described toxic components can be effectively removed by contacting an exhaust gas containing these toxic components with a cleaning agent having a composition consisting essentially of (1) cupric oxide and (2) at least one metal oxide selected from the group consisting of silicon oxide, aluminum oxide and zinc oxide.

Thus, the present invention relates to a method for cleaning an exhaust gas containing at least one toxic component selected from the group consisting of arsine, phosphine, diborane and hydrogen selenide, which comprises contacting the toxic component with a molded cleaning agent having a composition consisting essentially of (1) cupric oxide and (2) at least one metal oxide selected from the group consisting of silicon oxide, aluminum oxide and zinc oxide and having a density of from about 1.5 to about 3.5 g/ml, said composition having a metal atomic ratio $M/(M+Cu)$ in the range of from about 0.02 to about 0.7 wherein Cu represents a number of gram atom of copper and M represents a total number of gram atom of silicon, aluminum and/or zinc, to remove the toxic component from the exhaust gas.

SUMMARY OF THE INVENTION

An object of this invention is to provide a method for cleaning an exhaust gas containing toxic components effectively.

Another object of this invention is to provide a method for removing toxic components in an exhaust gas in a completely dry state without any problems thereby requiring no wetting treatment for the exhaust gas.

A still another object of this invention is to provide a method for cleaning an exhaust gas using a cleaning agent which is capable of removing a markedly large amount of toxic components per unit volume of the cleaning agent and which is capable of removing the toxic components at a high rate.

A further object of this invention is to provide a method for cleaning an exhaust gas using a cleaning agent which is improved in its safety due to no ignition problem upon contacting with air after use.

DETAILED DESCRIPTION OF THE INVENTION

The method of this invention can be applied to exhaust gases containing at least one hydride such as arsine, phosphine, diborane and hydrogen selenide. An exhaust gas containing one or more of any combination of the above hydrides can be cleansed effectively by the method of this invention.

The cleaning agent used in the present invention comprises (1) cupric oxide and (2) at least one metal oxide selected from the group consisting of silicon oxide, aluminum oxide and zinc oxide, and has a metal atomic ratio M/(M+Cu) in the range of from about 0.02 to about 0.7, preferably 0.03 to 0.55, wherein Cu represents a number of gram atom of copper and M represents a total number of gram atom of silicon, aluminum and/or zinc present in the cleaning agent. When the cleaning agent contains either silicon oxide, aluminum oxide or zinc oxide as component (2), M represents a number of gram atom of either silicon, aluminum or zinc, respectively. The cleaning agent having a total atomic ratio lower than about 0.02 is not suitable because it shows a low cleaning capacity of toxic components and also it is difficult to mold into a molded particle. On the other hand, the cleaning agent having total atomic ratio higher than about 0.7 shows a low cleaning capacity of toxic components.

The term "cleaning capacity" as used herein means a maximum cleaning ability represented in terms of a volume of toxic component which can be removed per unit weight or unit volume, as the case may be, of the cleaning agent.

The cleaning agent used in the present invention is molded as hereinafter described in detail, and has a density in the range of from about 1.5 to about 3.5 g/ml. The term "density" as used herein means a geometric bulk density, i.e., a value obtained by dividing the weight by the geometric volume of molded particles.

The cleaning agent used in the present invention can be prepared by various procedures. For example, an alkali such as sodium hydroxide, potassium hydroxide, sodium or potassium carbonate, sodium or potassium bicarbonate, ammonia and the like is added to a metal salt such as a nitrate, a sulfate, a chloride or an organic acid salt of copper or zinc to precipitate the intermediates of the oxide, and the resulting intermediates are calcined to obtain cupric oxide or zinc oxide which is then formulated into a composition at a metal atomic ratio within the range as described above. The precipitate obtained by adding an alkali to a metal salt is preferably a hydroxide or a basic carbonate, and a basic carbonate obtained by using sodium or potassium carbonate or sodium or potassium bicarbonate as alkali is more preferred. Alternatively, the cleaning agent can be prepared by mixing a powder of cupric oxide with silica sol as silicon oxide and/or alumina sol as aluminum oxide, and then the mixture is kneaded in a kneader and dried to obtain a prescribed composition.

These compositions are used in a molded material. In the present invention, the cleaning agent can be used in molded pellets or in an any shape obtained by crushing the molded pellets into an appropriate particle size. In molding the composition, a dry process or a wet process can be used, and a small amount of water or a lubricating agent may be added to the composition, if necessary.

The molded composition is not limited to any particular shapes, but typical examples thereof include spherical, cylindrical and rod shapes. The spherical shape preferably has a diameter of about 2 mm to about 12 mm, and the cylinderical or rod shape preferably has a diameter of about 2 mm to about 12 mm and a height of about 2 mm to about 12 mm. Generally, since materials to be packed in a column should preferably have a particle size of less than about 1/10 the inside diameter of the column, the molded particles of the cleaning agent according to the present invention are also advantageously used in such a particle size without causing irregular current of the exhaust gas stream during passing through the column filled with the cleaning agent.

The particles of the cleaning agent used in the present invention have a density in the range of about 1.5 to about 3.5 g/ml, more preferably about 2 to about 3.5 g/ml. When the density is lower than about 1.5, the molded particle tends to be brittle and moreover the cleaning amount per unit volume of the cleaning agent is reduced when the cleaning amount per unit weight is the same. On the other hand, when the density is higher than about 3.5, the cleaning amount per unit weight is reduced which is believed due to decrease in pore volume of the molded cleaning agent.

It is unexpected that the rather heavy cleaning agent has an extraordinary cleaning capacity at a low temperature. Such excellent cleaning capacity is believed due to the fact that the reaction between the metal oxides and the hydrides is not catalytic dehydrogenation but water forming reaction. This implies that the hydrides or active hydrogen generated from the hydrides react with the lattice oxygen of the oxides and thus bore pores big enough for them to enter inner side of the molded particles.

The cleaning agent is generally used in this invention as a fixed bed filled in a column or tube, but it may be used as a moving bed or fluidized bed.

The exhaust gas containing toxic components (hereinafter referred simply to "exhaust gas") is contacted with a cleaning agent while passing through a column filled with the cleaning agent whereby the toxic components are removed by sorption to obtain a cleansed gas.

The term "sorption" as used herein means that the toxic gases are removed from the exhaust gas and fixed by the cleaning agent by the reaction between the toxic gases and cleaning agent and, therefore, the sorption is distinguished from mere physical adsorption or absorption.

In the method of this invention, there is no particular limitation in the concentration of toxic components in the exhaust gas and also in the gas stream velocity. However, it is preferred that the higher the concentration of toxic components, the lower the gas velocity. More specifically, the method according to the present invention is preferably carried out at the operation parameter "y" in the range of:

$$0.0005 < y < 200$$

wherein $y = a \times b$ in which a represents a superficial linear velocity (cm/sec) of the exhaust gas passed through a column and b represents a concentration of toxic components (vol %) in the exhaust gas to be cleansed.

Under conditions where the operation parameter y is below 0.0005, the dimension (volume) of column becomes too high which, in turn, is not economical, whereas under conditions where the operation parameter y exceeds 200, sorption heat is generated and an appropriate cooling means may become necessary.

For example, when a hydrogen-based exhaust gas (hydrogen atmospheric gas) containing toxic gases at a concentration of more than 10 vol % is treated at a velocity of more than 20 cm/sec., the cleaning agent tends to be reduced with hydrogen by heat generation thereby losing its activity. In such an instance, the cleaning operation is preferably conducted with appropriate precautions such as cooling of the column filled with the cleaning agent.

The exhaust gas to be treated in the method of this invention is generally in a dry state, but a wet exhaust gas can also be treated unless the gas forms moisture condensation in the column filled with the cleaning agent.

In the method of this invention, a contacting temperature of the exhaust gas and the cleaning agent (an inlet gas temperature) is controlled to below about 200° C., preferably 0° to 150° C. In particular, when the hydrogen-based exhaust gas is used, it is preferred to adjust the contacting temperature (an inlet gas temperature) to below about 100° C. The method according to the present invention can be generally carried out at atmospheric temperature (e.g., at room temperature) without necessity of any heating or cooling means. The exhaust gas can be cleaned under atmospheric pressure, reduced pressure or pressurized conditions, but generally the pressure of exhaust gas can be adjusted below 20 kg/cm$^2$ (absolute pressure), preferably in the range of 0.001 to 10 kg/cm$^2$ (absolute pressure).

Since the method of this invention does not require a wetting treatment of the exhaust gas which is generally performed by a bubbler provided on the upstream side of an absorption column, a sorption apparatus containing the cleaning agent can be provided on the upstream side relative to a vacuum pump provided for suction of the exhaust gas and, in this embodiment, the exhaust gas can be cleaned under reduced pressure. In this manner, the exhaust gas passes through the vacuum pump after toxic components contained therein have been sorbed and removed and, thus, maintenance of the vacuum pump can be easily performed due to freedom of contamination with toxic components such as contamination of pump oil.

In accordance with the method of this invention, the exhaust gas containing various hydrides as toxic components discharged from the production step of semiconductors or optical fibers can be cleaned in a dry state, and, therefore, the present invention is very useful in industry. The characteristic features of the present invention can be summarized as follows:

(1) An amount of toxic components removed and a rate of removal per unit volume of the cleaning agent is very high.

(2) Various toxic hydrides can be removed completely regardless of their concentrations in the exhaust gas.

(3) The cleaning treatment can be performed at atmospheric temperature without requiring any cooling or heating means.

(4) A stable cleaning performance can be obtained always due to absence of water in the cleaning agent.

The present invention is further illustrated in greater detail by the following Examples and Comparative Examples, but the present invention is not limited thereto. Unless otherwise indicated, all percents are by weight.

EXAMPLES 1 TO 5

Each of the mixtures of copper nitrate and zinc nitrate at a Zn/(Zn+Cu) atomic ratio of 0.1, 0.2, 0.3, 0.5 and 0.67, respectively, was dissolved in an ionexchanged water at a concentration of 20 wt %. Separately, a 20 wt % aqueous solution containing a stoichiometric amount of sodium carbonate was prepared. The resulting sodium carbonate solution was added dropwise to the solution of nitrate mixture while stirring in a stirring tank to produce a precipitate of basic copper carbonate and basic zinc carbonate. The precipitate was filtered, washed with water and dried at 120° C. for 10 hours. The precipitate was then calcined at a temperature of 350° C. for 5 hours to obtain five mixtures of cupric oxide and zinc oxide having different proportions.

Each of the resulting mixtures was molded by tableting into pellets of 6 mm diameter and 6 mm height. The density of pellets was 2.8 g/ml and the packing density of pellets was 1.8 kg/l. These pellets were crushed and passed through a sieve of 12 to 28 mesh (JIS standard, hereinafter the same) to obtain a cleaning agent.

About 1 g of the resulting cleaning agent was packed in a cleaning column of hard polyvinyl chloride having an inside diameter of 13 mm and a length of 200 mm (packed height: about 4 mm), and a nitrogen gas containing 1 vol % of arsine as a gas to be treated was passed through the column at a rate of 3 liters/hour (at a superficial linear velocity in a column of 0.63 cm/sec.) to determine the cleaning capacity for each of the cleaning agents. The results obtained are shown in Table 1 below.

COMPARATIVE EXAMPLE 1

20 g of an aqueous solution containing 20 wt % of ferric chloride was sprayed onto 56 g (100 ml) of activated alumina (tradename: Neo Bead D4, 6 to 10 mesh) to prepare an absorbent which contained 0.025 g of iron metal per gram of activated alumina. 1 g of the resulting absorbent was used in place of 1 g of the cleaning agent used in Example 1 to determine the cleaning capacity in the same manner as described in Example 1. The results obtained are also shown in Table 1 below.

COMPARATIVE EXAMPLE 2

20 g of an aqueous solution containing 5 wt % of potassium permanganese was sprayed onto 56 g (100 ml) of activated alumina (tradename: Neo Bead D4, 6–10 mesh), followed by drying (4 times each at 120° C.) to prepare an absorbent which contained 0.025 g of manganese metal per gram of activated alumina. 1 g of the resulting absorbent was used in place of 1 g of the cleaning agent used in Example 1 to determine the cleaning capacity in the same manner as described in Example 1. The results obtained are also shown in Table 1 below.

TABLE 1

| Example No. | Gas Composition | Atomic Ratio of Metals Zn/(Zn + Cu) | Cleaning Capacity Nl/Kg of Cleaning agent | Nl/l of Cleaning agent |
| --- | --- | --- | --- | --- |
| Example 1 | $N_2$ + $AsH_3$ | 0.1 | 163 | 293 |
| Example 2 | $N_2$ + $AsH_3$ | 0.2 | 136 | 244 |
| Example 3 | $N_2$ + $AsH_3$ | 0.3 | 122 | 220 |
| Example 4 | $N_2$ + $AsH_3$ | 0.5 | 72 | 130 |
| Example 5 | $N_2$ + $AsH_3$ | 0.67 | 26 | 47 |
| Comparative | $N_2$ + $AsH_3$ | $FeCl_3$/Activated Alumina | 1 | 2 |

TABLE 1-continued

| Example No. | Gas Composition | Atomic Ratio of Metals Zn/(Zn + Cu) | Cleaning Capacity Nl/Kg of Cleaning agent | Nl/l of Cleaning agent |
| --- | --- | --- | --- | --- |
| Example 1 Comparative Example 2 | $N_2$ + $AsH_3$ | $KMnO_4$/Activated Alumina | 1.5 | 3 |

EXAMPLE 6

The cleaning capacity was determined under the same condition as used in Example 1 but replacing the nitrogen gas by hydrogen gas. The results obtained are shown in Table 2 below.

TABLE 2

| Example No. | Gas Composition | Atomic Ratio of Metals Zn/(Zn + Cu) | Cleaning Capacity Nl/Kg of Cleaning agent | Nl/l of Cleaning agent |
| --- | --- | --- | --- | --- |
| Example 6 | $H_2$ + $AsH_3$ | 0.1 | 162 | 292 |

EXAMPLES 7 TO 9

The cleaning capacity was determined by passing a nitrogen gas containing 1 vol % of phosphine, diborane or hydrogen selenide under the same condition as used in Example 1. The results obtained are shown in Table 3 below.

TABLE 3

| Example No. | Gas Composition | Atomic Ratio of Metals Zn/(Zn + Cu) | Cleaning Capacity Nl/Kg of Cleaning agent | Nl/l of Cleaning agent |
| --- | --- | --- | --- | --- |
| Example 7 | $N_2$ + $PH_3$ | 0.1 | 166 | 299 |
| Example 8 | $N_2$ + $B_2H_6$ | 0.1 | 50 | 90 |
| Example 9 | $N_2$ + $SeH_2$ | 0.1 | 177· | 319 |

EXAMPLES 10 to 17

Each of 20 wt % aqueous solutions of copper nitrate and sodium carbonate was prepared separately, and the resulting sodium carbonate aqueous solution was added dropwise to the copper nitrate aqueous solution while stirring in a stirring tank to prepare a precipitate of basic copper carbonate. The precipitate was filtered, washed with water, dried at 120° C. and then calcined at 350° C. to produce a powder of cupric oxide. To the resulting powder was added alumina sol or silica sol in an amount sufficient to provide an atomic ratio Al/(Al +Cu) of 0.07 or an atomic ratio Si/(Si+Cu) of 0.08, respectively. Each of the mixtures was kneaded in a kneader, calcined again at 350° C. and molded by a tableting machine into tablets of 6 mm diameter and 6 mm height to prepare a cleaning agent. The tablets thus obtained had a density of 2.8 g/ml and a packing density of 1.8 kg/liter.

The cleaning capacity was determined using each of the cleaning agents obtained above under the same condition as used in Examples 1 to 5. The results obtained are shown in Table 4 below.

TABLE 4

| Example No. | Gas Composition | Components | M/(M + Cu) | Cleaning Capacity Nl/Kg of Cleaning agent | Nl/l of Cleaning agent |
| --- | --- | --- | --- | --- | --- |
| Example 10 | $N_2$ + $AsH_3$ | Cupric Oxide + Aluminum Oxide | 0.07 | 141 | 254 |
| Example 11 | $N_2$ + $PH_3$ | Cupric Oxide + Aluminum Oxide | 0.07 | 130 | 234 |
| Example 12 | $N_2$ + $B_2H_6$ | Cupric Oxide + Aluminum Oxide | 0.07 | 53 | 95 |
| Example 13 | $N_2$ + $SeH_2$ | Cupric Oxide + Aluminum Oxide | 0.07 | 140 | 252 |
| Example 14 | $N_2$ + $AsH_3$ | Cupric Oxide + Silicon Oxide | 0.08 | 120 | 216 |
| Example 15 | $N_2$ + $PH_3$ | Cupric Oxide + Silicon Oxide | 0.08 | 130 | 234 |
| Example 16 | $N_2$ + $B_2H_6$ | Cupric Oxide + Silicon Oxide | 0.08 | 49 | 88 |
| Example 17 | $N_2$ + $SeH_2$ | Cupric Oxide + Silicon Oxide | 0.08 | 120 | 216 |

EXAMPLES 18 TO 26

A quartz column having the same size as that of the polyvinyl chloride column used in Example 1 was packed with 32 g of each of the cleaning agents used in Examples 1, 10 and 14 (packing volume: about 20 ml). A nitrogen gas containing 1 vol % of arsine, phosphine, diborane or hydrogen selenide was then passed through the column at a superficial linear velocity of 50 liters/hour (10.5 cm/sec.), and the time until break through of the gas was determined using the following detector tubes. The results obtained are shown in Table 5.

Arsine: Detector Tube No. 19L manufactured by GAS TECH Company; minimum detectable limit, 0.05 ppm Phosphine: Detector Tube No. 7L manufactured by GAS TECH Company; minimum detectable limit, 0.15 ppm Diborane: Detector Tube CH-181 manufactured by Riken-Dräger A.G.; minimum detectable limit, 0.05 ppm Hydrogen Selenide: Detector Tube No. 167 manufactured by Komyo Rikagaku Company; minimum detectable limit, 0.5 ppm nitrogen atmosphere to prepare an adsorbent. The resulting adsorbent contained 0.063 g of copper metal and 0.065 g of zinc metal per 1 g of activated alumina. The time until break through was then determined using the resulting alumina under the same condition as used in Example 21. The results obtained are also shown in Table 7.

TABLE 5

| Example No. | Gas Composition | Composition of Cleaning Agent Components | M/(M + Cu) | Time until Break Through (min.) |
|---|---|---|---|---|
| Example 18 | $AsH_3 + N_2$ | Cupric Oxide + Zinc Oxide | 0.1 | 417 |
| Example 19 | $AsH_3 + N_2$ | Cupric Oxide + Aluminum Oxide | 0.07 | 361 |
| Example 20 | $AsH_3 + N_2$ | Cupric Oxide + Silicon Oxide | 0.08 | 307 |
| Example 21 | $PH_3 + N_2$ | Cupric Oxide + Zinc Oxide | 0.1 | 425 |
| Example 22 | $PH_3 + N_2$ | Cupric Oxide + Aluminum Oxide | 0.07 | 332 |
| Example 23 | $B_2H_6 + N_2$ | Cupric Oxide + Zinc Oxide | 0.1 | 115 |
| Example 24 | $B_2H_6 + N_2$ | Cupric Oxide + Silicon Oxide | 0.08 | 113 |
| Example 25 | $SeH_2 + N_2$ | Cupric Oxide + Aluminum Oxide | 0.07 | 322 |
| Example 26 | $SeH_2 + N_2$ | Cupric Oxide + Silicon Oxide | 0.08 | 276 |

EXAMPLES 27 TO 28

The time until break through was determined under the same condition as used in Examples 18 and 21 but changing the concentration of arsine and phosphine in the nitrogen gas to 100 ppm. The results obtained are shown in Table 6 below.

TABLE 6

| Example No. | Gas Composition | Concentration of Topic Gas | Composition of Cleaning Agent Components | Zn/((Zn + Cu) | Time until Break Through (hours) |
|---|---|---|---|---|---|
| Example 28 | $N_2 + AsH_3$ | 100 ppm | Cupric Oxide + Zinc Oxide | 0.1 | 1007 |
| Example 29 | $N_2 + PH_3$ | 100 ppm | Cupric Oxide + Zinc Oxide | 0.1 | 1025 |

COMPARATIVE EXAMPLE 3

Activated carbon (16 to 24 mesh) was impregnated with a copper nitrate solution, then dried at 120° C. for 2 hours and impregnated with a potassium hydroxide solution, then dried at 120° C. for 2 hours. The impregnated carbon was then calcined at 300° C. for 30 minutes in a nitrogen atmosphere to prepare an adsorbent. The resulting adsorbent contained 0.063 g of copper metal and 0.078 g of potassium metal per 1 g of activated carbon. The time until break through was determined using 12 g of the resulting carbon (packing volume: about 20 ml) under the same condition as used in Example 18. The results obtained are shown in Table 7.

COMPARATIVE EXAMPLE 4

Activated alumina (Neo Bead D4, 6 to 10 mesh) was impregnated with copper nitrate and zinc nitrate, and after drying, calcined at 300° C. for 30 minutes in a

COMPARATIVE EXAMPLE 5

15 g of the adsorbent prepared in the same manner as described in Comparative Example 1 (packing volume: about 20 ml) was used to determine the time until break through under the same condition as used in Comparative Example 3. The results obtained are also shown in Table 7.

COMPARATIVE EXAMPLE 6

15 g of the adsorbent prepared in the same manner as described in Comparative Example 2 (packing volume: about 20 ml) was used to determine the time until break through under the same condition as used in Comparative Example 3. The results obtained are also shown in Table 7.

TABLE 7

| Example No. | Gas Composition | Concentration of Toxic Gas | Composition of Cleaning Agent | Time until Break Through (min.) |
|---|---|---|---|---|
| Comparative Example 3 | $N_2 + AsH_3$ | 1% | Activated Carbon + Cupric Oxide + Potassium Hydroxide | 5 |
| Comparative Example 4 | $N_2 + PH_3$ | 1% | Alumina + Cupric Oxide + Zinc Oxide | 3 |
| Comparative Example 5 | $N_2 + AsH_3$ | 1% | Alumina + Ferric Chloride | 2 |
| Comparative Example 6 | $N_2 + AsH_3$ | 1% | Alumina + Permangdnate Potassium | 3 |

EXAMPLE 30

A mixture of oxides having a Zn/(Zn +Cu) atomic ratio of 0.1 was prepared in the same manner as described in Example 1. Alumina sol was added to the resulting powder, and the mixture was kneaded in a kneader, dried at 120° C. for 10 hours and calcined at 350° C. The powder was then molded by a tabletting machine into tablets having a diameter of 6 mm and a height of 6 mm to prepare a cleaning agent. The particles of the resulting tablets has a density of 2.8 g/ml. The cleaning capacity of the cleaning agent was determined in the same manner as described in Examples 1 to 5, and the results obtained are shown in Table 8.

TABLE 8

| Example No. | Gas Composition | Composition of Cleaning Agent Zn + Al/Zn + Al + Cu | Cleaning Capacity | |
|---|---|---|---|---|
| | | | Nl/Kg of Cleaning Agent | Nl/l of Cleaning Agent |
| 30 | $N_2 + AsH_3$ | 0.15 | 135 | 243 |

While the invention has been described in detail and with reference to specific embodiments thereof, it will be apparent to one skilled in the art that various changes and modifications can be made therein without departing from the spirit and scope thereof.

What is claimed is:

1. A method for cleaning an exhaust gas containing at least one toxic hydride component selected from the group consisting of arsine, phosphine, diborane and hydrogen selenide in hydrogen or nitrogen, which comprises contacting the toxic hydride component with a molded cleaning agent having a composition consisting essentially of (1) cupric oxide and (2) at least one metal oxide selected from the group consisting of silicon oxide, aluminum oxide and zinc oxide and having a density of from about 1.5 to about 3.5 g/ml at atmospheric temperature, said composition having a metal atomic ratio M/(M+Cu) in the range of from about 0.03 to about 0.55, wherein Cu represents a number of gram atom of copper and M represents a total number of gram atom silicon, aluminum and/or zinc, to remove said toxic hydride component from the exhaust gas wherein the toxic hydride is oxidized by the reaction between the hydride and the at least one metal oxide and fixed by the cleaning agent.

2. A method as claimed in claim 1, wherein said cupric oxide is obtained by calcining a basic copper carbonate.

3. A method as claimed in claim 1, wherein said cupric oxide is obtained by drying and calcining a basic copper carbonate produced by reaction of a copper salt with an alkali metal carbonate or an alkali metal bicarbonate.

4. A method as claimed in claim 1, wherein said contacting is carried out by passing said exhaust gas through a column filled with said molded cleaning agent.

5. A method as claimed in claim 4, wherein said contacting is performed at an operation parameter y in the range of:

$$0.0005\ y < 200$$

wherein $y = a \times b$ in which a represents a superficial linear velocity (cm/sec.) of said exhaust gas passed through a column and b represents a concentration (vol %) of said toxic components in said exhaust gas to be cleansed.

6. A method as in claim 1, wherein said toxic hydride component is selected from the group consisting of arsine, phosphine and diborane.

* * * * *